US012609373B2

(12) United States Patent
Kim et al.

(10) Patent No.: US 12,609,373 B2
(45) Date of Patent: Apr. 21, 2026

(54) PULSATING HEAT PIPE-BASED BATTERY COOLING MODULE AND BATTERY UNIT INCLUDING THE SAME

(71) Applicant: KOREA ADVANCED INSTITUTE OF SCIENCE AND TECHNOLOGY, Daejeon (KR)

(72) Inventors: Sung Jin Kim, Daejeon (KR); Young Jong Lee, Daejeon (KR); Jonghyun Lim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 1051 days.

(21) Appl. No.: 17/638,182

(22) PCT Filed: Oct. 19, 2021

(86) PCT No.: PCT/KR2021/014563
§ 371 (c)(1),
(2) Date: Feb. 25, 2022

(87) PCT Pub. No.: WO2022/211201
PCT Pub. Date: Oct. 6, 2022

(65) Prior Publication Data
US 2024/0055694 A1 Feb. 15, 2024

(30) Foreign Application Priority Data

Mar. 30, 2021 (KR) ........................ 10-2021-0041102
Jun. 16, 2021 (KR) ........................ 10-2021-0077837

(51) Int. Cl.
H01M 10/6557 (2014.01)
F28F 13/10 (2006.01)
(Continued)

(52) U.S. Cl.
CPC ......... H01M 10/6554 (2015.04); F28F 13/10 (2013.01); H01M 10/613 (2015.04); H01M 50/204 (2021.01)

(58) Field of Classification Search
CPC ...................... H01M 10/6557; H01M 10/6552
See application file for complete search history.

(56) References Cited

U.S. PATENT DOCUMENTS

2008/0087406 A1* 4/2008 Asfia ................... F28D 15/0275
165/104.33

FOREIGN PATENT DOCUMENTS

CN 101818999 A 9/2010
CN 105280978 A 1/2016
(Continued)

OTHER PUBLICATIONS

English translation of CN 101818999 A from espacenet (Year: 2010).*
(Continued)

*Primary Examiner* — Nicholas A Smith
*Assistant Examiner* — Zackary Richard Cochenour
(74) *Attorney, Agent, or Firm* — Tarolli, Sundheim, Covell & Tummino LLP

(57) ABSTRACT

The present disclosure relates to a pulsating heat pipe-based battery cooling module and a battery unit including the same. The cooling module using the pulsating heat pipe may include: a plurality of heating plates which are arranged in parallel such that both sides or one side of the heating plates contact a plurality of battery cells, while forming a space in which the plurality of battery cells are accommodatable; at least one cooling plate which allows a coolant to flow; and a plurality of channels which are in contact with the plurality of heating plates and the at least one cooling plate, have a sealed tube shape and a working fluid filled in a portion of (Continued)

the sealed tube shape in such a way as to function as the pulsating heat pipe. The proposed cooling module minimizes the temperature difference within the battery cell and efficiently absorbs the heat, thereby reducing the overall temperature of the battery cell.

6 Claims, 7 Drawing Sheets

(51) Int. Cl.
    *H01M 10/613*     (2014.01)
    *H01M 10/6554*     (2014.01)
    *H01M 50/204*     (2021.01)

(56)            References Cited

FOREIGN PATENT DOCUMENTS

| | | | |
|---|---|---|---|
| CN | 210168380 | U | 3/2020 |
| CN | 211605356 | U | 9/2020 |
| CN | 112072203 | A | 12/2020 |
| JP | 08111244 | A | 4/1996 |
| KR | 1020160041407 | A | 4/2016 |
| KR | 20200011301 | A * | 2/2020 .......... H01M 10/627 |

OTHER PUBLICATIONS

Machine translation of Kr20160041407A from Espacenet (Year: 2016).*

"Types of Heat Pipes." Celsia, Jan. 19, 2021, celsiainc.com/heat-sink-blog/types-of-heat-pipes/. Accessed Jan. 19, 2021 snapshot via wayback machine (Year: 2021).*

Machine translation of CN112072203A from espacenet (Year: 2020).*

Machine translation of KR20200011301A from PE2E (Year: 2020).*

KR Office Action for corresponding KR Application No. 10-2021-0077837, dated Aug. 1, 2023, pp. 1-6.

International Search Report issued in connection with corresponding PCT Patent Application No. PCT/KR2021/014563 dated Feb. 8, 2022.

* cited by examiner

[Fig. 1]
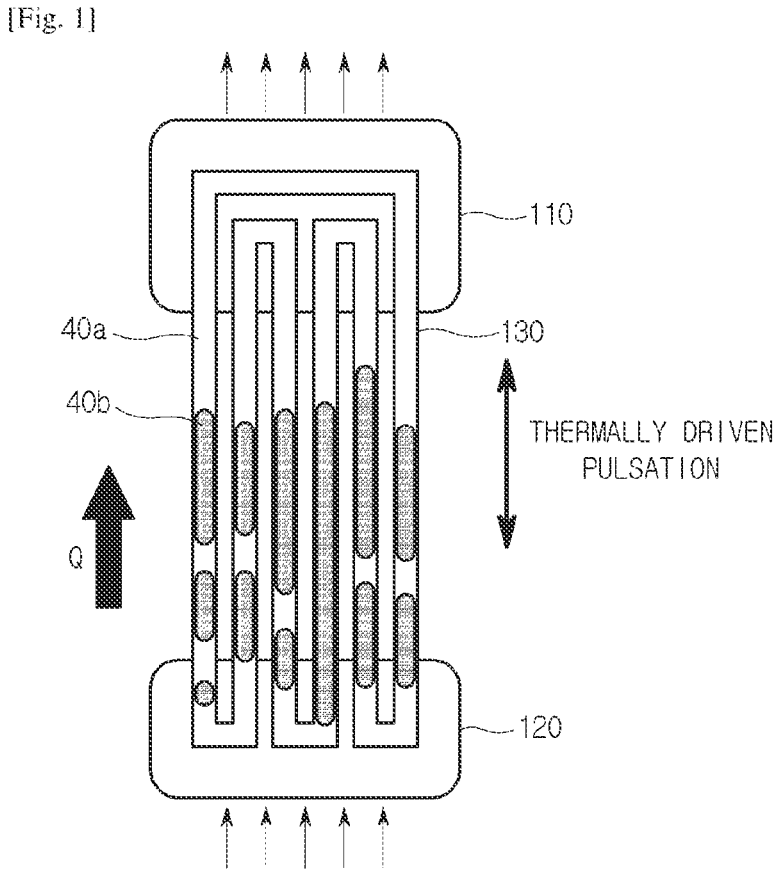

[Fig. 2c]
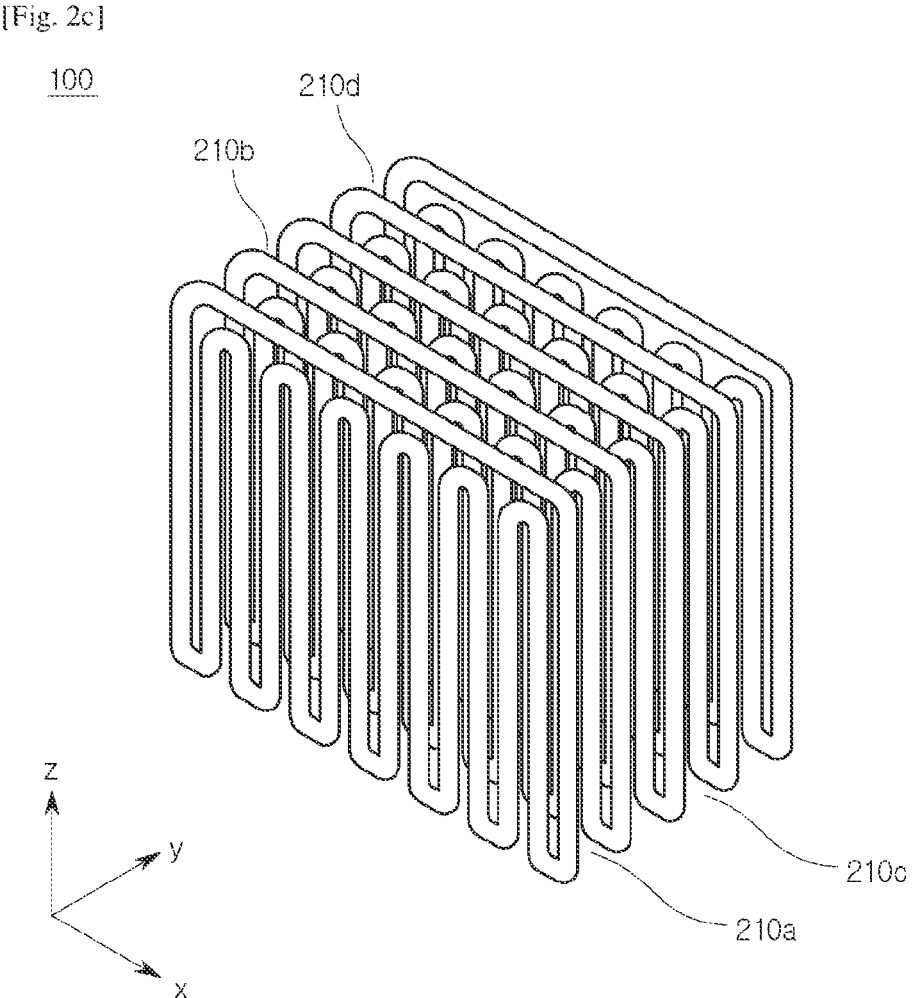

[Fig. 3]

[Fig. 4]
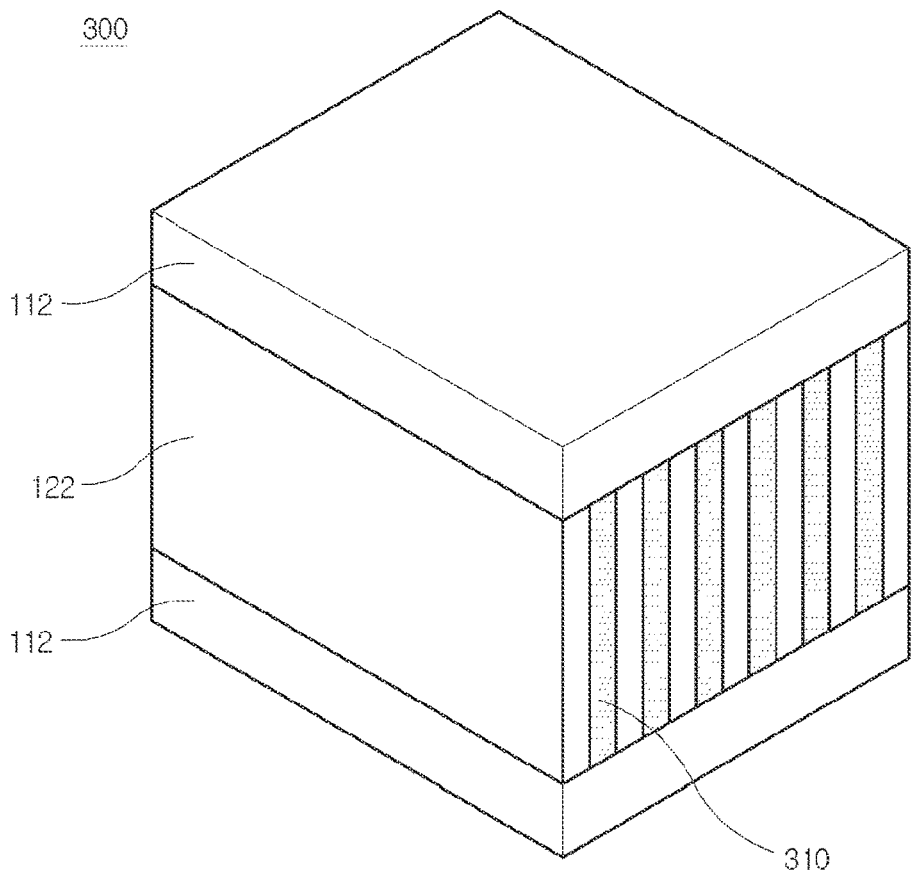
[Fig. 5]

[Fig. 6]
[Fig. 7]
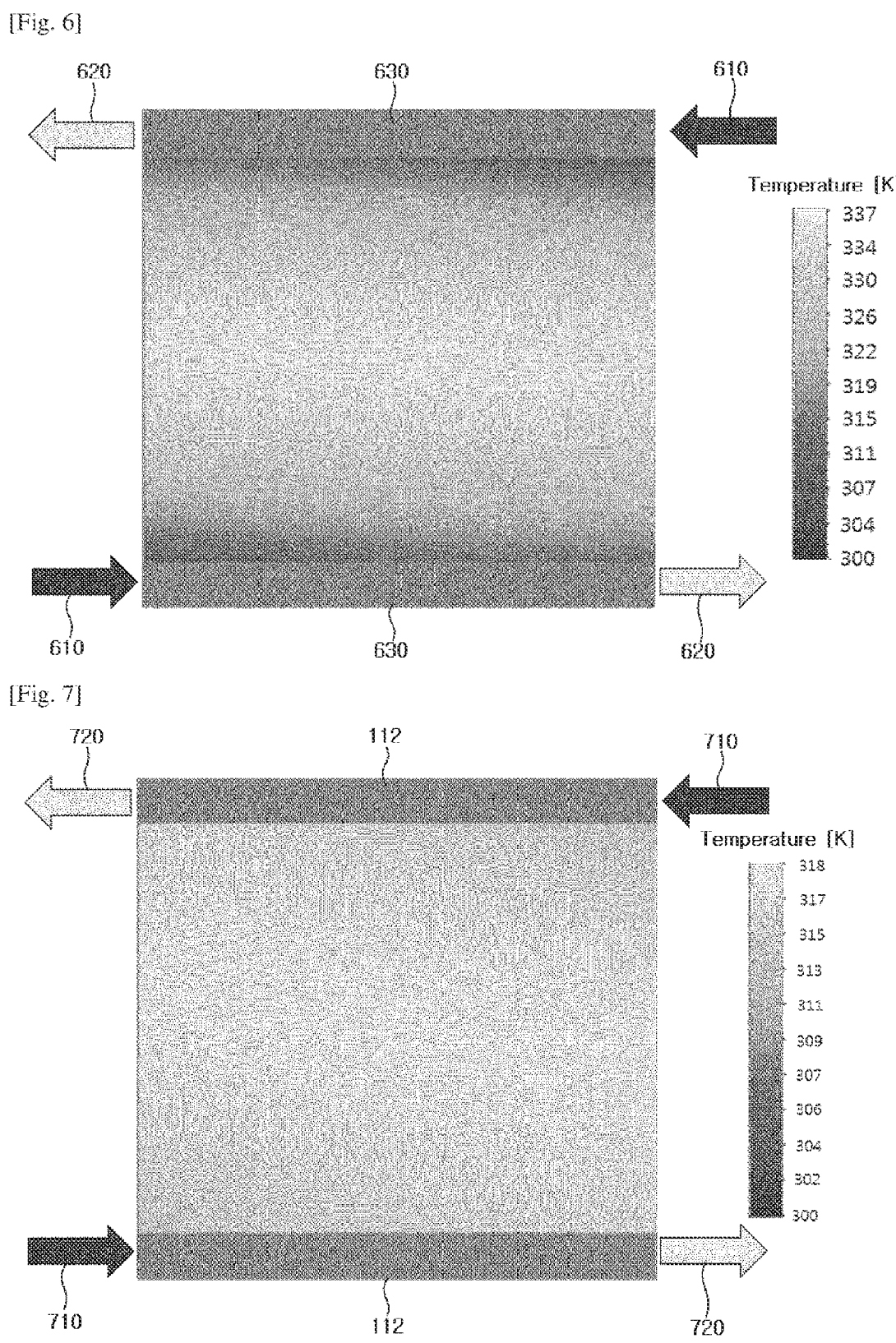

PULSATING HEAT PIPE-BASED BATTERY COOLING MODULE AND BATTERY UNIT INCLUDING THE SAME

RELATED APPLICATIONS

The present invention is a U.S. National Stage under 35 USC 371 patent application, claiming priority to Serial No. PCT/KR2021/014563, filed on Oct. 19, 2021; which claims priority from Korean Patent Application No. 10-2021-0041102 filed on Mar. 30, 2021 and Korean Patent Application No. 10-2021-0077837 filed on Jun. 16, 2021; the entirety of all are hereby incorporated herein by reference.

TECHNICAL FIELD

Various embodiments relate to a pulsating heat pipe-based battery cooling module and a battery unit including the same.

BACKGROUND ART

Recently, a demand for an eco-friendly electric vehicle is significantly increasing and, in the future, the demand for the electric vehicle is expected to exceed a demand for an existing internal combustion vehicle that have been mainly used. As a result, a demand for high-performance and high-heat emission battery which is a major part of the electric vehicle is rapidly increasing.

There are two main types of batteries used in an electric vehicle, that is to say, a valve regulated lead-acid (VRLA) battery and a lithium-ion battery. Currently, though the VRLA battery is mainly used, the amount of the lithium-ion battery used is expected to increase rapidly due to the high charge rate and high energy density of the lithium-ion battery.

The lithium-ion battery is commonly used in energy storage systems (ESSs) as well as electric vehicles.

However, the lithium-ion battery is very sensitive to high temperatures. When a temperature rises, the efficiency decreases rapidly and battery performance deteriorates. Also, excessive temperature rise causes a thermal runaway phenomenon due to the dissolution of the electrolyte, leading to accidents such as fire.

The increase in demand for a high-performance, high-heat electric vehicle battery due to the expansion of the electric vehicle market and the increase in ESS demand due to the expansion of new and renewable energy production are expected to continuously increase the amount of the lithium-ion battery used. In preparation for this, it is essential to develop an efficient battery thermal management module.

At present, a thermal management method which is mainly used for battery cooling includes a method which uses a cooling plate where a flow path exists and a method which absorbs and radiates heat through a metal heat radiation fin.

An index for evaluating the cooling performance of a battery cooling method include a maximum temperature within a battery cell and a maximum temperature difference within a battery cell. The temperature difference in a battery cell generates thermal stress due to the difference in the degree of thermal expansion, so that physical damage may occur.

The cooling method which uses the metal heat radiation fin cannot be said to have a high cooling performance. Meanwhile, the battery cooling method which uses a cooling plate where a flow path exists has a much higher cooling performance than the method which uses the metal heat radiation fin. However, due to a high pressure drop due to a relatively long flow path, the battery cooling method which uses a cooling plate where a flow path exists can allow only a small amount of flow at the same pumping power, so that it can have only a small heat capacity. Therefore, although the inlet end of the flow path has a good cooling performance by a cooling fluid, the temperature of the fluid rises at the outlet end of the flow path and efficient cooling cannot be performed compared to the inlet end. Therefore, a large temperature gradient is formed at the inlet and outlet ends of the flow path, so that there is a problem that efficient thermal management is still impossible under high heat generation.

DISCLOSURE OF INVENTION

Technical Problem

The purpose of the present disclosure is to provide a battery cooling device capable of efficient thermal management even under high heat generation.

Various embodiments of the present disclosure provide the battery cooling device capable of efficiently cooling a battery by using a pulsating heat pipe having a very high thermal conductivity compared to a cooling plate.

The technical problem to be overcome in this document is not limited to the above-mentioned technical problems. Other technical problems not mentioned can be clearly understood from those described below by a person having ordinary skill in the art.

Solution to Problem

According to various embodiments of the present disclosure, a cooling module using a pulsating heat pipe includes one sealed tube wherein a portion of the sealed tube is filled with a working fluid. The sealed tube extends to continue to be bent at a right angle inside a virtual rectangular parallelepiped exterior and forms a space in which a plurality of battery cells are accommodatable and a plurality of channels which function as the pulsating heat pipe. A portion of each of the plurality of channels functions as a condenser, and another portion functions as an evaporator.

According to various embodiments of the present disclosure, a cooling module using a pulsating heat pipe may include: a plurality of heating plates which are arranged in parallel such that both sides or one side of the heating plates contact a plurality of battery cells, while forming a space in which the plurality of battery cells are accommodatable; at least one cooling plate which allows a coolant to flow; and a plurality of channels which are in contact with the plurality of heating plates and the at least one cooling plate, have a sealed tube shape and a working fluid filled in a portion of the sealed tube shape in such a way as to function as the pulsating heat pipe.

According to various embodiments of the present disclosure, a battery unit includes: a plurality of battery cells; a plurality of heating plates which have the same size as that of the battery cell, respectively and are alternately disposed while in contact with the plurality of battery cells; at least one cooling plate which allows a coolant to flow; and a plurality of channels which are in contact with the plurality of heating plates and the at least one cooling plate, have a sealed tube shape and a working fluid filled in a portion of the sealed tube shape in such a way as to function as the pulsating heat pipe.

Advantageous Effects of Invention

According to various embodiments, the pulsating heat pipe-based cooling device proposed in the present disclosure minimizes the temperature difference within the battery cell and the temperature difference between the plurality of battery cells by a very high thermal conductivity of the cooling plate composed of the pulsating heat pipe, and efficiently absorbs the heat, thereby reducing the overall temperature of the battery cell.

According to various embodiments, the pulsating heat pipe-based cooling device proposed in the present disclosure does not need to transfer the coolant between the battery cells, so that power for pumping the coolant can be greatly reduced.

According to various embodiments, in the pulsating heat pipe-based cooling device proposed in the present disclosure, as a result of simulation comparison, the maximum temperature can be reduced by about 10 degrees compared to a conventional cooling device, and the internal temperature difference can be reduced by more than five times.

Advantageous effects that can be obtained from the present disclosure are not limited to the above-mentioned effects. Further, other unmentioned effects can be clearly understood from the following descriptions by those skilled in the art to which the present disclosure belongs.

BRIEF DESCRIPTION OF DRAWINGS

FIG. 1 is a view for describing an operating principle of a pulsating heat pipe (PHP);

FIGS. 2a to 2c show structures of a battery cooling module using the pulsating heat pipes according to various embodiments of the present disclosure;

FIG. 3 shows the structure of the battery cooling module 100 which further includes a heating plate 122 and a cooling plate 112 according to various embodiments of the present disclosure;

FIG. 4 shows a structure of a battery unit according to various embodiments of the present disclosure;

FIG. 5 shows that, when a conventional method using the cooling plate is used, the temperature distribution of the cooling plate through a numerical analysis;

FIG. 6 shows that, when a conventional method using a metal heat radiation fin is used, the temperature distribution of a heat radiation plate through a numerical analysis; and FIG. 7 shows the temperature distribution of the heating plate of the cooling module using the pulsating heat pipes proposed in the present disclosure through a numerical analysis.

MODE FOR THE INVENTION

Hereinafter, embodiments of the present disclosure will be described in detail with reference to the accompanying drawings, in which the same or similar components will be given the same reference numerals, and redundant description thereof will be omitted.

In the following description of the embodiments disclosed herein, if it is determined that the detailed description of the related known technology may obscure the gist of the embodiments disclosed herein, the detailed description thereof will be omitted. In addition, since the accompanying drawings are intended to facilitate understanding of the embodiments disclosed herein, it should be understood that the technical scope disclosed in the present specification is not limited by the accompanying drawings and includes all changes, equivalents, and substitutes included in the spirit and scope of the present invention.

While terms including ordinal numbers such as the first and the second, etc., can be used to describe various components, the components are not limited by the terms mentioned above. The terms are used only for distinguishing between one component and other components.

FIG. 1 is a view for describing an operating principle of a pulsating heat pipe (PHP).

Referring to FIG. 1, unlike other conventional heat dissipating devices, the pulsating heat pipe may connect an evaporator 120 and a condenser 110 in a smooth shape without a wick structure therein and may include a plurality of channels 130 which are also connected to each other. A working fluid can be partially injected into the channel 130 of the pulsating heat pipe in a sealed and vacuumed state.

Unlike conventional devices, since the pulsating heat pipe is composed of a bunch of smooth channels without a wick structure, it is easy to form various shapes. Therefore, the pulsating heat pipe can have a higher space utilization than that of the conventional device and can be easy to manufacture.

Figure 2A:
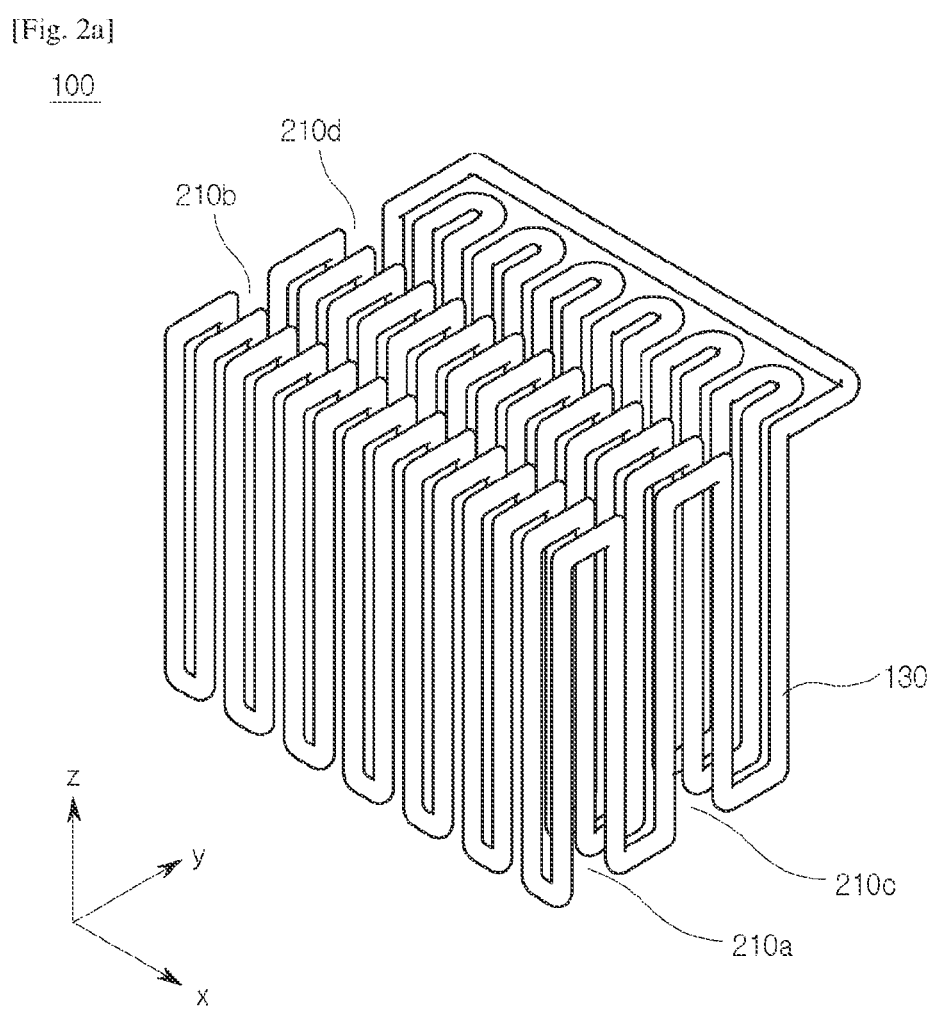
Figure 2B:
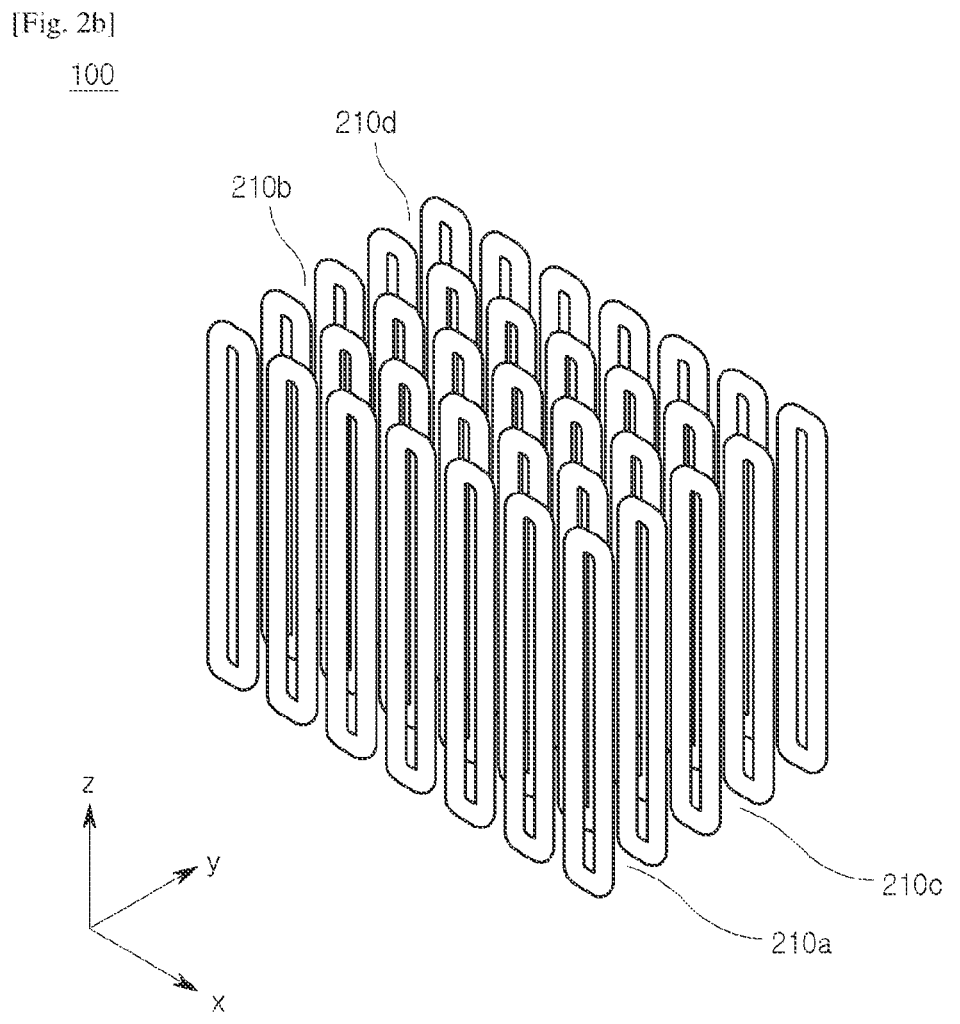

In FIG. 1, when heat is applied to the evaporator 120 and air or coolant is applied to the condenser 110, the working fluid injected into the channel 130 of the pulsating heat pipe pulsates between the evaporator 120 and the condenser 110, and the heat applied to the evaporator 120 can be transferred to the condenser 110 by the movement of the pulsating working fluid. That is, when the diameter of the channel 130 is less than a certain value, the working fluid filled in the channel is configured in the form of a slug-train of a liquid slug 40a and a gaseous slug 40b and pulsates between the evaporator 120 and the condenser 110 due to the pressure difference in gas by evaporation and condensation. By the pulsation, the heat can be effectively transferred to the evaporator 120 and the condenser 110, without a wick structure. Although there is a limit in that the diameter of the channel 130 must be small in order for the working fluid within the channel 130 to pulsate, this can be an advantage on the one hand because the size of the overall shape of the channel can be reduced. Also, since the pulsating heat pipe does not have a wick structure, the pulsating heat pipe can be implemented with a soft and easily bendable tube, and thus can be manufactured in various shapes. FIGS. 2a to 2c show structures of a battery cooling module using the pulsating heat pipes according to various embodiments of the present disclosure.

Referring to FIG. 2a, the battery cooling module 100 using the pulsating heat pipe may be formed in the form of a single tube having the plurality of channels 130 of the pulsating heat pipe.

The battery cooling module 100 may have a rectangular parallelepiped shape as a whole, and may form spaces 210a, 210b, 210c, and 210d into which the battery cells can be inserted therebetween, and may be formed to have a winding shape such that the plurality of channels 130 of the pulsating heat pipe can be formed. According to the embodiments, the plurality of channels 130 may be formed along a Z-axis.

In the case of the structure shown in FIG. 2a, since the channels contacting the inserted battery cells are connected to each other, heat exchange is possible between the battery cells, thereby maintaining a very small temperature difference between the battery cells.

According to another embodiment, as shown in FIG. 2b, a plurality of rectangular tubes capable of forming two channels of the pulsating heat pipe are provided, and the tubes form a rectangular parallelepiped shape as a whole and are arranged to form the spaces 210*a*, 210*b*, 210*c*, and 210*d* into which the battery cells can be inserted therebetween. Accordingly, the battery cooling module 100 can be formed.

According to further another embodiment, as shown in FIG. 2*c*, a plurality of single tubes forming the plurality of channels which are in contact with one side of the battery cell and are capable of performing a pulsating heat pipe function are provided, and the tubes form a rectangular parallelepiped shape as a whole and are arranged to form the spaces 210*a*, 210*b*, 210*c*, and 210*d* into which the battery cells can be inserted therebetween. Accordingly, the battery cooling module 100 can be formed.

According to the embodiment, the top and bottom surfaces of the battery cooling module 100 which correspond to the X-Y plane in the structures of FIGS. 2*a* to 2*c* may operate as the condenser 110, and a portion formed in the X-Z plane around the spaces 210*a*, 210*b*, 210*c*, and 210*d* into which the battery cells can be inserted may operate as the evaporator 120. Accordingly, a middle region of each channel 130 of the pulsating heat pipe is heated in contact with the battery cell, and both ends of each channel 130 may operate as the condenser 110.

Figure 3:
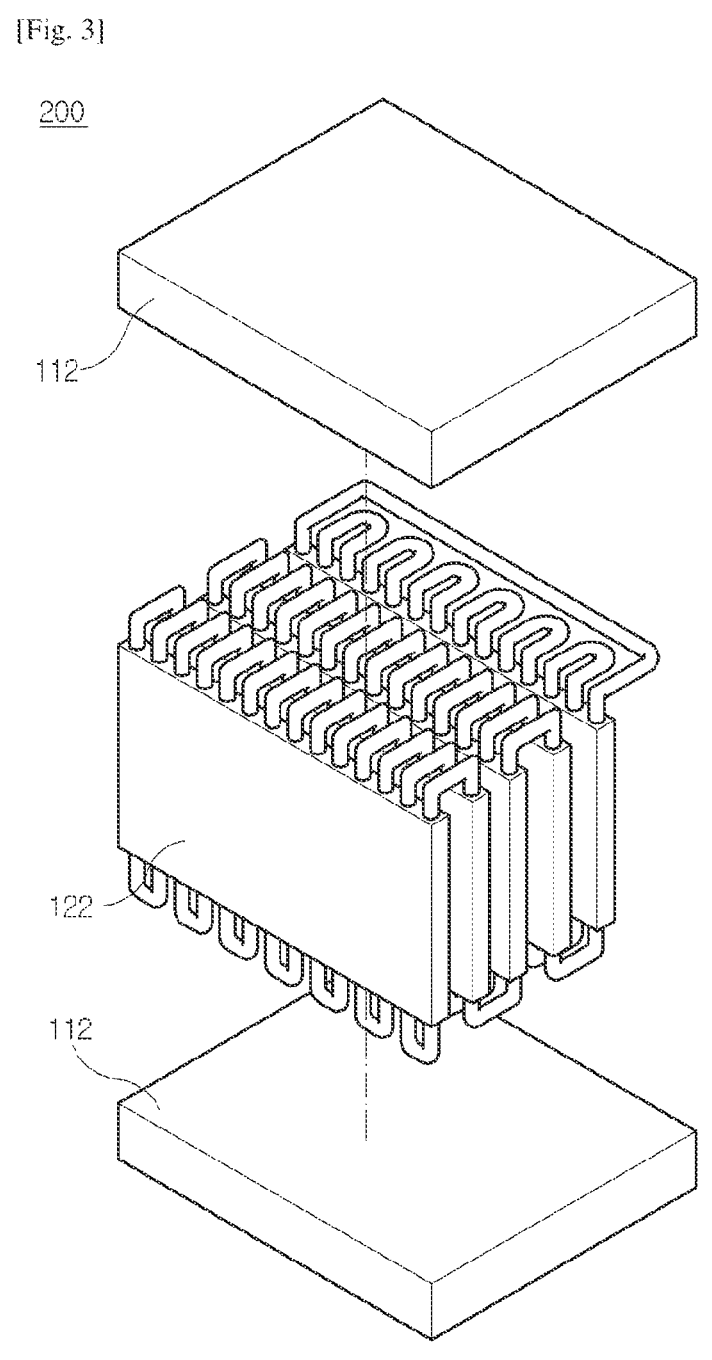

FIG. 3 shows the structure of the battery cooling module which further includes a heating plate 122 and a cooling plate 112 according to various embodiments of the present disclosure.

Referring to FIG. 3, the battery cooling module 200 may add the cooling plate 112 to the condenser 110 in order to enable additional cooling in the channel of the pulsating heat pipe formed in FIGS. 2*a* to 2*c*. According to the embodiment, the cooling plate 112 may be provided to contact the condenser 110 on the top surface or the bottom surface of the condenser 110. According to another embodiment, in order that the condenser 110 is included within the cooling plate 112, the cooling plate 112 may be provided such that the end of the channel 130, that is, the condenser 110 is positioned within the cooling plate 112. According to another embodiment, the cooling plate 112 may be formed such that a portion of the cooling plate 112 becomes a portion of the channel 130. Additionally, the cooling plate 112 may be provided with a flow path such that a coolant is introduced thereinto in one direction and flows in the other direction, or the entire cooling plate 112 may operate as a single flow path.

The battery cooling module 200 may further include the heating plate 122 so as to easily absorb the heat from the inserted battery cells.

According to the embodiment, the heating plate 122 is provided between the evaporator 120 of the channel 130 and the inserted battery cell and contact with the evaporator and the battery cell, thereby increasing the contact area with the battery cell, so that the heat of the battery cell is transferred faster toward the channel. According to another embodiment, the heating plate 122 may be formed to surround the channel such that the channel 130 is included therein. According to further another embodiment, the heating plate 122 may have a plurality of through-holes, and each of the through-holes may become a portion of the channel 130. In this case, the heating plate 122 may be formed as a thin film plane which has a short Y-axis direction length and a long X-axis length, and a plurality of cylindrical passages that may be a portion of the channel along the Z-axis may be formed.

FIG. 4 shows a structure of a battery unit according to various embodiments of the present disclosure.

Referring to FIG. 4, the battery unit 300 may include the battery cooling module 200 and a plurality of battery cells 310 inserted into a space within the battery cooling module 200.

The heating plate 122 of the battery cooling module 200 is in direct contact with the battery cell 310 and is heated by the heat generated in the battery cell 310, and the heat can be transferred to the condenser 110 by the pulsation of the fluid within the channel 130 of the pulsating heat pipe formed in the battery cooling module 200. The heat transferred to the condenser 110 can be cooled, and the cooling plate 112 can be additionally attached to the condenser 110 in order to increase cooling performance. Cooling air or coolant is supplied to the cooling plate 112 and contacts the condenser 110 of the channel 130, thereby further increasing the cooling performance.

FIGS. 5 to 7 show the cooling performance of conventional two battery cooling methods using a numerical analysis and the cooling performance of a cooling method using the pulsating heat pipe proposed in the present disclosure.

For numerical analysis, the following conditions are applied. Water at room temperature is supplied as a coolant, the size of the battery cell is 200 mm×160 mm×4 mm, a heat flux is 0.5 W/cm², the dimension of the flow path through which the coolant flows is 1.5 mm×1 mm, and a pumping power is 0.012 Nm.

FIG. 5 shows that, when a conventional method using the cooling plate is used, the temperature distribution of the cooling plate through a numerical analysis.

The result of FIG. 5 is based on a premise that a cooling plate having a flow path through which the coolant flows is provided instead of the heating plate 122 of FIG. 4 in accordance with the conventional cooling plate method.

In FIG. 5, an arrow 510 indicates an inlet of the flow path through which the coolant is introduced, and an arrow 520 indicates an outlet of the flow path through which the coolant which has flowed along the flow path of the cooling plate is discharged.

Referring to FIG. 5, it can be seen that while the temperature of the cooling plate near the inlet of the flow path through which the coolant is introduced is low, the temperature of the cooling plate near the outlet of the flow path through which the coolant is discharged is high. The highest temperature of the cooling plate is 326.9 K, the lowest temperature is 303.7 K, and the average temperature is 319.1 K. The temperature difference between the highest and lowest temperatures is 23.2 K.

FIG. 6 shows that, when a conventional method using a metal heat radiation fin is used, the temperature distribution of a heat radiation plate through a numerical analysis.

In a cooling method using a metal heat radiation fin, the coolant flows through the cooling plate placed above and/or below the battery cells, and heat radiation plates with the metal heat radiation fins are placed between the battery cells, so that the heat absorbed by the metal heat radiation fins is transferred to the cooling plate through the heat radiation plate and is cooled.

The result of FIG. 6 shows the temperature distribution of the heat radiation plate provided at the location of the heating plate 122 of FIG. 4 in accordance with the conventional cooling method using the metal heat radiation fin.

In FIG. 6, an arrow 610 indicates an inlet of the flow path through which the coolant is introduced into a cooling plate 630, and an arrow 620 indicates an outlet of the flow path through which the coolant which has passed through the cooling plate 630 is discharged.

Referring to FIG. 6, it can be seen that while the temperature of the heat radiation plate near the cooling plate 630 is low, the temperature at the center of the heat radiation plate which is far from the cooling plate 630 is high. The highest temperature of the heat radiation plate is 337.4 K, the lowest temperature is 311.9 K, and the average temperature is 330.3 K. The temperature difference between the highest and lowest temperatures is 25.5 K.

Referring to these results, it can be understood that the cooling method using the cooling plate has a better performance than that of the conventional cooling method using the metal heat radiation fin.

FIG. 7 shows the temperature distribution of the heating plate of the cooling module using the pulsating heat pipes proposed in the present disclosure through a numerical analysis.

In FIG. 7, an arrow 710 indicates an inlet of the flow path through which the coolant is introduced into the cooling plate 112, and an arrow 720 indicates an outlet of the flow path through which the coolant which has passed through the cooling plate 112 is discharged.

Referring to FIG. 7, it can be seen that a similar temperature distribution is shown over the entire heating plate. The highest temperature of the heating plate is 317.2 K, the lowest temperature is 313.3 K. and the average temperature is 317.1 K. The temperature difference between the highest and lowest temperatures is 3.9 K.

Table 1 compares the results of the conventional cooling method and the cooling method using the pulsating heat pipe proposed in the present disclosure.

TABLE 1

|  | Cooling plate method of FIG. 5 | Metal heat radiation fin of FIG. 6 | Method proposed in the present disclosure |
|---|---|---|---|
| Highest Temperature (K) | 326.9 | 337.4 | 317.2 |
| Lowest Temperature (K) | 303.7 | 311.9 | 313.3 |
| Temperature difference (K) | 23.2 | 25.5 | 3.9 |

Referring to Table 1 above, it can be found that the cooling method using the pulsating heat pipe proposed in the present disclosure can further reduce the maximum temperature than the conventional method and has an excellent cooling performance by making the temperature difference between locations as small as 3.9 K.

That is, compared to the conventional metal heat radiation fin method and the cooling plate method, the cooling method proposed in the present disclosure can maintain a very small internal temperature difference while reducing the maximum temperature by a high thermal conductivity of the pulsating heat pipe.

The above-described numerical analysis shows the numerical analysis results for one battery cell. In the case of the plurality of battery cells, in the cooling method using the pulsating heat pipe proposed in the present disclosure, since the channels for each battery cell are connected to each other, heat exchange is possible between the battery cells, thereby maintaining a very small temperature difference between the battery cells.

According to various embodiments, the cooling module using the pulsating heat pipe may include one scaled tube therein in which a portion of the working fluid is filled. The sealed tube may extend to continue to be bent at a right angle inside a virtual rectangular parallelepiped exterior and may form a space in which the plurality of battery cells are accommodatable and the plurality of channels which function as the pulsating heat pipe. A portion of each of the plurality of channels may function as the condenser, and another portion may function as the evaporator.

According to various embodiments, each of the plurality of channels may be provided to have a length which allows a portion of each channel to further protrude in an up and down or in a right and left direction than the plurality of battery cells, and the portion which further protrudes than the battery cell of each of the channels may function as the condenser.

According to various embodiments, the cooling module may further include the cooling plate which allows a coolant to flow, and the protruding portion may be inserted into the cooling plate.

According to various embodiments, the cooling module may further include the heating plate, and remaining portions other than the portion which further protrudes than the battery cell of each of the channels may be inserted into the heating plate.

According to various embodiments, the cooling module using the pulsating heat pipe may include: a plurality of the heating plates which are arranged in parallel such that both sides or one side of the heating plates contact the plurality of battery cells, while forming a space in which the plurality of battery cells are accommodatable; at least one cooling plate which allows the coolant to flow; and the plurality of channels which are in contact with the plurality of heating plates and the at least one cooling plate, have a portion of the working fluid filled therein in such a way as to function as the pulsating heat pipe, and have the sealed tube shape.

According to various embodiments, each of the plurality of channels may have a length greater than that of the heating plate, and each of the plurality of channels may be disposed to pass through the inside of the heating plate. At least a portion of a region protruding from the heating plate of each of the plurality of channels may be disposed within the cooling plate.

According to various embodiments, the heating plate of the cooling module may have a plurality of through-holes, and each of the plurality of through-holes may become a portion of the sealed tubular channel.

According to various embodiments, the plurality of channels of the cooling module may be formed by extending one sealed tube while continuously bending the one sealed tube at a right angle.

According to various embodiments, the battery unit may include: a plurality of battery cells; a plurality of heating plates which have the same size as that of the battery cell, respectively and are alternately disposed while in contact with the plurality of battery cells; at least one cooling plate which allows a coolant to flow; and a plurality of channels which are in contact with the plurality of heating plates and the at least one cooling plate, have a sealed tube shape and a working fluid filled in a portion of the sealed tube shape in such a way as to function as the pulsating heat pipe.

According to various embodiments, the at least one cooling plate of the battery unit is disposed above and below the plurality of alternating heating plates and the plurality of battery cells, and each of the plurality of channels has a length greater than that of the heating plate in an up and down direction. Each of the plurality of channels may be disposed to pass through the inside of the heating plate, and at least a portion of a region protruding from the heating plate of each of the plurality of channels may be disposed within the at least one cooling plate.

According to various embodiments, the heating plate of the battery unit may have a plurality of through-holes, and each of the plurality of through-holes may become a portion of the sealed tubular channel.

According to various embodiments, the plurality of channels of the battery unit may be formed by extending one sealed tube while continuously bending the one sealed tube at a right angle.

As described above, the cooling module using the pulsating heat pipe and the battery unit including the same proposed in the present disclosure can minimize the temperature difference within the battery cell by a very high thermal conductivity of the cooling plate composed of the pulsating heat pipe, can reduce the overall temperature by efficiently absorbing the heat, and can greatly reduce the pumping power for injecting the coolant because there is no need to allow the coolant to flow between the battery cells. As a result, it can be expected that, compared to the conventional cooling methods, the maximum temperature can be reduced by about 10 degrees and the internal temperature difference can be reduced by more than five times. Such technical differences of the battery cooling system can be used as a stepping stone to occupy the entire battery market in advance.

The invention claimed is:

1. A cooling module using a pulsating heat pipe, the cooling module comprising:

a plurality of heating plates which are arranged in parallel such that both sides or one side of the heating plates contact a plurality of battery cells, while forming a space in which the plurality of battery cells are accommodatable;

at least one cooling plate which allows a coolant; and a plurality of channels comprising a continuous sealed tube bent at right angles, the continuous sealed tube being in contact with the plurality of heating plates and the at least one cooling plate, the plurality of channels having a working fluid filled in a portion of the sealed tube in such a way as to function as the pulsating heat pipe.

2. The cooling module of claim 1, wherein each of the plurality of channels has a length greater than that of each of the plurality of heating plates, wherein each of the plurality of channels is disposed to pass through the inside each of the plurality of heating plates, and wherein at least a portion of a region protruding from each of the plurality of heating plates of each of the plurality of channels is disposed within the cooling plate.

3. The cooling module of claim 1, wherein each of the plurality of heating plates comprises a plurality of through-holes, and wherein each of the plurality of through-holes becomes a portion of the continuous sealed tube.

4. A battery unit comprising:

a plurality of battery cells;

a plurality of heating plates which have the same size as that of the battery cell, respectively and are alternately disposed while in contact with the plurality of battery cells;

at least one cooling plate which allows a coolant to flow; and a plurality of channels comprising a continuous sealed tube bent at right angles, the continuous sealed tube being in contact with the plurality of heating plates and the at least one cooling plate, the plurality of channels having a working fluid filled in a portion of the sealed tube in such a way as to function as the pulsating heat pipe.

5. The battery unit of claim 4, wherein the at least one cooling plate is disposed above and below the plurality of alternating heating plates and the plurality of battery cells, wherein each of the plurality of channels has a length greater than that of each of the plurality of heating plates in an up and down direction, wherein each of the plurality of channels is disposed to pass through the inside of each of the plurality of heating plates, and wherein at least a portion of a region protruding from each of the plurality of heating plates of each of the plurality of channels is disposed within the at least one cooling plate.

6. The battery unit of claim 4, wherein each of the plurality of heating plates comprises a plurality of through-holes, and wherein each of the plurality of through-holes becomes a portion of the continuous sealed tube.

* * * * *